Figure 1A:
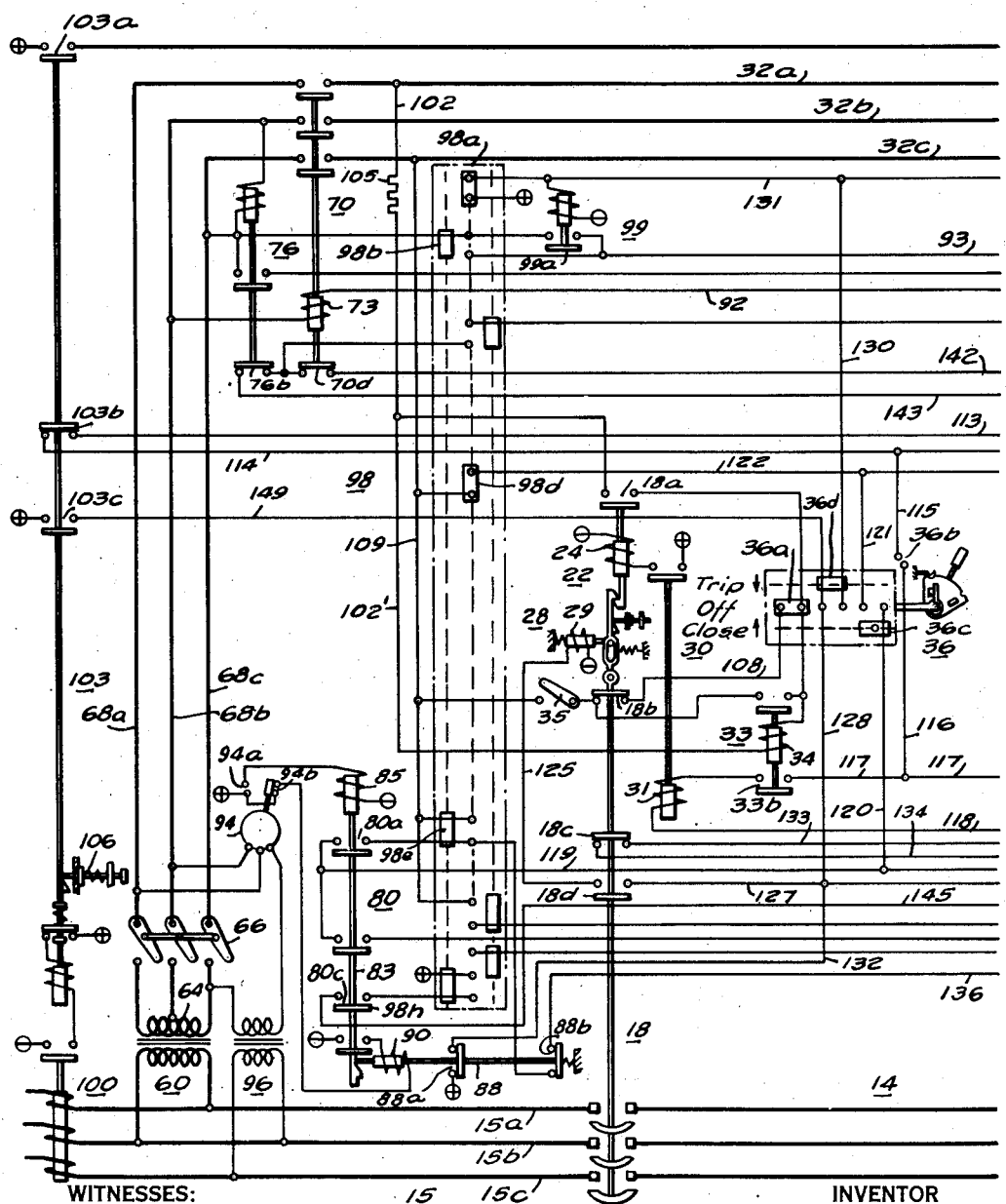

June 21, 1949. G. L. CLAYBOURN 2,473,863
TRANSFER SYSTEM
Filed July 17, 1947
2 Sheets-Sheet 1

WITNESSES:
INVENTOR
Glen L. Claybourn.
BY
ATTORNEY

June 21, 1949.

G. L. CLAYBOURN 2,473,863

TRANSFER SYSTEM

Filed July 17, 1947

2 Sheets-Sheet 2

WITNESSES:
E. A. McCloskey.
F. V. Giolma

INVENTOR
Glen L. Claybourn.
BY
G. M. Crawford
ATTORNEY

Patented June 21, 1949

2,473,863

UNITED STATES PATENT OFFICE 2,473,863

TRANSFER SYSTEM

Glen L. Claybourn, Pittsburgh, Pa., assignor to Westinghouse Electric Corporation, East Pittsburgh, Pa., a corporation of Pennsylvania Application July 17, 1947, Serial No. 761,567

9 Claims. (Cl. 171—97)

My invention relates, generally, to transfer systems, and has reference in particular to automatic transfer systems for connecting a circuit or bus to one or the other of a pair of power sources or supply lines to insure continuity of service.

Generally stated, it is an object of my invention to provide an improved transfer system which is simple and inexpensive to manufacture and is reliable and effective in operation.

More specifically, it is an object of my invention to provide a transfer system wherein a single control switch is used to provide for either manual transfer, or automatic transfer, with one or the other of two power sources or supply lines as the preferred one.

It is also an object of my invention to provide, in an automatic transfer system, for using a mechanically latched control relay so as to prevent loss of control circuit selection upon failure of the control voltage.

Another object of my invention is to provide, in an automatic transfer system, for preventing transfer under predetermined fault conditions.

Yet another object of my invention is to provide, in a transfer system, for automatically transferring the control bus from one source to the other in the event of failure of voltage of the one source, independently of the transfer of the power bus or circuit.

A more specific object of my invention is to provide, in a transfer system, for immediate transfer of a power circuit or bus from one source or incoming supply line to another after initiation of a transfer operation.

Other objects will, in part, be obvious and will, in part, be explained hereinafter.

In practicing my invention in one of its forms, a feeder bus or circuit is disposed to be connected to one or the other of two power sources or incoming lines through separate circuit breakers which are individually controlled by transfer relays of the electrically operated, mechanically latched and electrically reset type. The transfer relays are in turn controlled by voltage responsive relays responsive to the voltages of the power sources, and a manual selector switch which so sets up the circuits for the transfer relays that either one or the other of the power sources is made the preferred source. The same selector switch also controls the connections of the transfer relays so as to determine whether the transfer system is set up for manual or automatic operation. The control circuits are energized from one source or the other, depending upon the operating position of the selector switch, and are transferable independently of the power circuits in response to the failure of voltage of the preferred source. Automatic transfer is prevented when a loss of voltage results from a fault condition on the feeder bus.

Figure 1B:
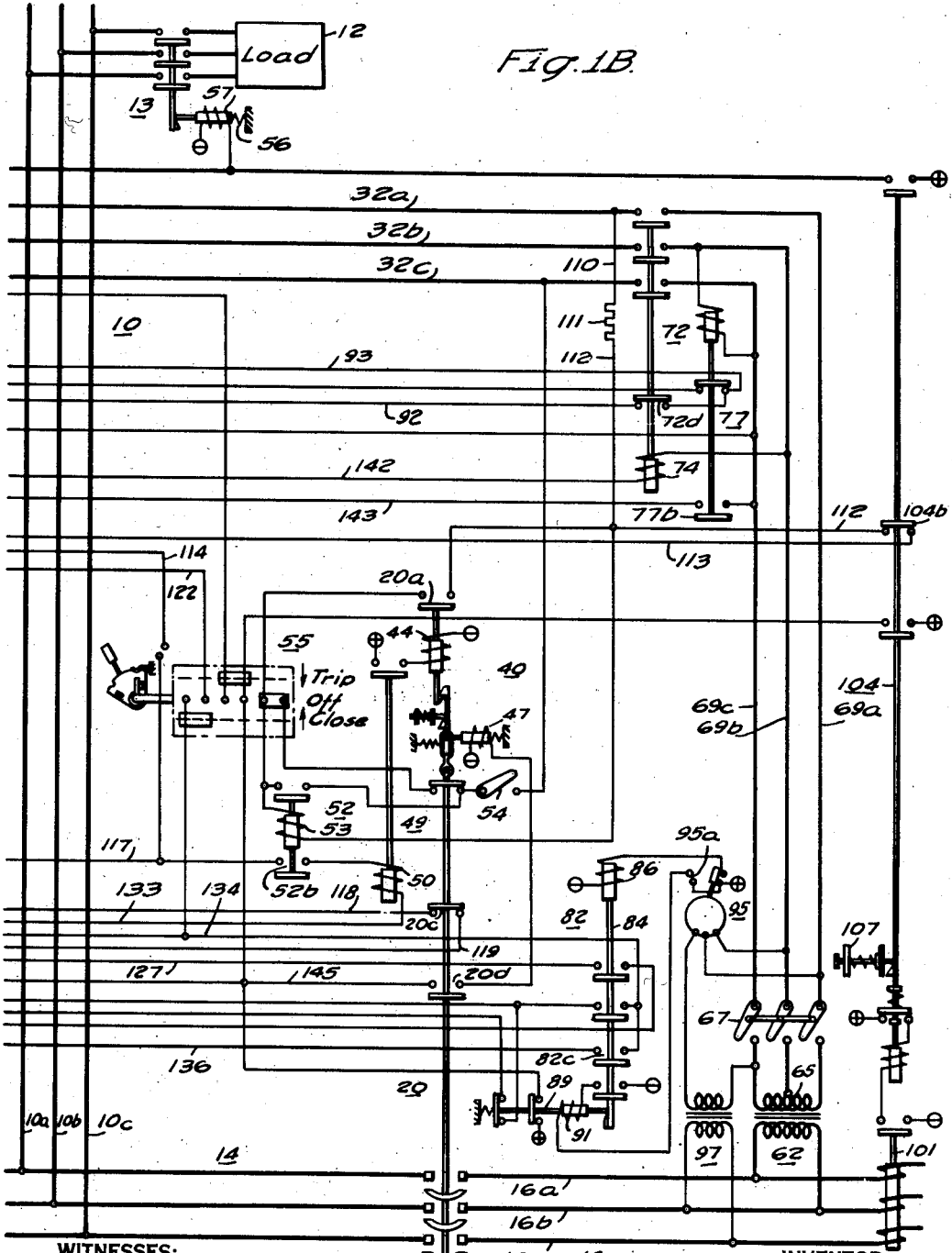

For a more complete understanding of the nature and scope of my invention, reference may be made to the following detailed description which may be studied in connection with the accompanying drawings, in which:

Figures 1A and 1B, when placed together, in side-by-side relation, provide a diagrammatic view of a transfer system embodying the invention in one of its forms.

Referring to Figs. 1A and 1B, the reference numeral 10 may denote, generally, a feeder bus comprising conductors 10a, 10b and 10c for supplying electrical energy to a load 12 through a feeder circuit breaker 13. The bus 10 is connected to a main bus 14 which may be selectively energized from either the conductors 15a, 15b and 15c or 16a, 16b and 16c, which represent different power sources 15 and 16, through main circuit breakers 18 and 20, respectively.

The main circuit breaker 18 may be of any suitable type, such as the trip-free type illustrated, having an operating mechanism 22 provided with a closing winding 24 and a trip winding 26.

The closing operation of the breaker 18 may be controlled by a closing relay 30 having an operating winding 31 which may be energized from a suitable source of control potential which may be obtained from control bus conductors 32a, 32b and 32c by means of a cut-off relay 33 having an operating winding 34. A cutout switch 35 may be provided for disconnecting the operating winding 34 from the control bus conductors. A manual control switch 36 may be provided for controlling the operation of the closing relay and the trip means for affecting manual operation of the circuit breaker. The manual control switch may be provided with a slip contact member 36b which completes a circuit in the "close" position, and opens it in the "trip" position.

The circuit breaker 20 may be generally similar in all respects to the circuit breaker 18 being, for example, provided with an operating mechanism 40 provided with a winding 44 and a trip winding 47.

The circuit breaker 20 may be provided with a closing relay 49 having an operating winding 50 disposed to be energized from a suitable source of control potential such as the conductors 32a, 32b and 32c by means of a cut-off relay 52 having an operating winding 53. The operating winding 53 may be connected to the control source through a cutout switch 54. Manual control of the circuit breaker 20 may be affected by means of a manual control switch 55 similar to the control switch 36, and which may be operable to selectively energize the operating winding 50 of the closing relay, or the trip winding 47 for manually closing or opening the circuit breaker, respectively.

The feeder circuit breaker 13 may be of any suitable type, and provided with manual or automatic control means of any type well known in the art. Trip means 56 having an operating winding 57 may be provided for opening the circuit breaker to disconnect the load 12 from the bus conductors 10a, 10b and 10c.

In order to provide a suitable control voltage for effecting operation of the main circuit breakers 18 and 20 and their associated control relays, single phase operating transformers 60 and 62 may be connected to the source conductors 15a, 15b and 16a, 16b, respectively. The transformers 60 and 62 may be provided with center taps 64 and 65 on their secondary windings, which windings may be connected to the control conductors 32a, 32b and 32c by means of cutout switches 66, 67 and conductors 68a, 68b, 68c and 69a, 69b, 69c, through control change-over switches 70 and 72 having operating windings 73 and 74, respectively. Voltage responsive control relays 76 and 77 may be connected between the center taps and one terminal of the secondary windings of the operating transformers for controlling operation of the change-over switches 70 and 72 in order to insure connection of the control conductors to whichever source provides the proper voltage conditions.

In order to provide for automatically connecting the feeder bus 10 to whichever of the main power sources 15 or 16 provides the necessary voltage, transfer relays 80 and 82 may be provided for controlling the connections of the main circuit breakers 18 and 20. The transfer relays 80 and 82 may be of the electrically operated, mechanically latched and electrically reset type comprising, for example, armatures 83 and 84, having operating windings 85 and 86, respectively. The armatures may be mechanically latched in the operating or closed position by latch means 88 and 89, provided with reset windings 90 and 91 for retracting the latch means to permit the armatures 83 and 84, respectively to return to the non-operative or open position. By using transfer relays of this type, loss of control voltage resulting from a blown fuse or the like is prevented from changing the control circuit set up, thus making the control positive and certain. Operation of the transfer relays 80 and 82 may be controlled by means of master voltage relays 94 and 95 which may be of the polyphase type. The master relays may have a relatively slow response operating characteristic, so that the moving contact members require an appreciable time to move between the normal and under voltage contacts thereof. In order to provide polyphase voltages for operating the relays 94 and 95, potential transformers 96 and 97 may be connected to the source conductors 15b, 15c and 16b, 16c, respectively, so as to provide an open-delta, 3-phase voltage with their respective operating transformers 60 and 62.

In order to provide for selectively connecting the control relays of the circuit breakers 18 and 20 for either manual control of the circuit breakers, or for automatic operation thereof, with either the power source 15 or the power source 16 being the preferred source, a master selector switch 98 may be provided. The selector switch may be of any suitable type being, for example, of the drum type, with contact segments arranged to selectively connect the circuit breaker control means in one position for automatic operation with the source 15 being the preferred source; in an intermediate position, for manual operation; or in a third position for automatic control with the source 16 being the preferred source. An auxiliary manual control relay 99 may be provided to provide control power when manual operation is desired.

In order to prevent automatic transfer of the feeder bus from one power source to the other where the loss of voltage results from a fault on the feeder bus, current responsive relays 100 and 101 may be provided in connection with the source conductors 15a, 15b, 15c and 16a, 16b, 16c, respectively. Auxiliary protective relays 103 and 104 having latch means 106 and 107 to maintain them in the operative position may be provided in conjunction with the relays 100 and 101 for energizing the trip winding 57 of the circuit breaker 13 and for interrupting the operating circuits for the control relays 33 and 49, so as to prevent operation of the transfer relays 80 and 82 from connecting the bus conductors 10 to the other of the power sources when it is disconnected from one in response to a fault on the feeder bus. The auxiliary relays may be manually reset to restore operation of the system. The transfer relays, trip means and auxiliary protective relays may be energized from a reliable source such as a battery, which is represented by the + and — terminal marking.

With the system in the condition as shown, the control voltage relays 76 and 77 will normally be in the operating position whenever the cutout switches 66 and 67 are closed, provided that the power source conductors, 15a, 15b, 15c and 16a, 16b, 16c are properly energized. The master voltage relays 94 and 95 will operate so that the moving contact members engage the normal voltage contact members 94a and 95a, respectively. Accordingly, the operating windings 85 and 86 of the transfer relays 80 and 82 will be energized. The armatures 83 and 84 will be actuated to the operated positions, wherein they will be latched by the latch members 88 and 89, respectively.

If it is desired to effect manual operation of either one of the main circuit breakers 18 or 20, the master selector switch 98 may be left in the intermediate position as shown, whereupon the auxiliary manual relay 99 will be in the energized position. With the manual control switch 36 operated to the "off" position, an energizing circuit is provided for the operating winding 34 of the cut-off relay 33, extending from the control conductor 32a through conductor 102, resistor 105, conductor 102′, operating winding 34, contact member 36a of the control switch 36, conductor 108, normally closed contact members 18b of circuit breaker 18, cut-out switch 35 and conductor 109, back to the control conductor 32c. With the master selector switch 98 in the "manual" position as shown, and the auxiliary relay 99 energized, an energizing circuit is provided for the operating winding 73 of the change-over switch 70, extending from conductor 68b through operating winding 73, conductor 92, contact member 72d, conductor 93, and contact member 99a to control conductor 68c. Change-over switch 70 closes and connects the control conductors 32a, 32b, 32c to the source 15.

If the manual control switch 36 is now operated to the "close" position, an energizing circuit is provided for the operating winding 31 of the closing relay 30, extending from the control conductor 32a through conductor 110, resistor 111, conductor 112, contact member 104b, conductor 113, contact member 103b, conductors 114 and 115, slip contacts 36b of the manual control switch 36, conductor 116, conductor 117, contact members 33b of the cut-off relay 33, operating winding 31, conductor 118, contact member 20c of the circuit breaker 20, conductors 119 and 120, contact member 36c of the control switch 36, conductors 121 and 122, contact member 98d of the master selector switch, and conductor 109, back to control conductor 32c.

The closing relay 30 operates, and completes an obvious energizing circuit for the operating winding 24 of the circuit breaker 18, causing closure of the main circuit breaker 18. The cut-off relay 33 is shunted through contact member 18a of the circuit breaker causing it to return to the deenergized position. The energizing circuit for the operating winding 31 of the closing relay 30 is thereupon deenergized by the opening of contact members 33b.

The circuit breaker 18 may be tripped by operating the manual control switch 36 to the "trip" position. An energizing circuit for the trip winding 29 will thereupon be provided extending from negative through the trip winding 29, conductor 125, contact members 18d, conductors 127 and 128, contact member 36d, conductors 130 and 131, contact member 98a, to the positive terminal of the control source. The trip means 28 will thereupon be actuated to release the operating mechanism 22 and open the circuit breaker. The cut-off relay 33 will be energized as soon as the circuit breaker returns to the deenergized position through contact members 18b, provided the manual control switch 36 has been returned to the "off" position.

Should it be desired to effect automatic control of the main circuit breakers 18 and 20, the master selector switch 98 may be operated to either of its two automatic operating positions, depending upon which of the power sources 15 and 16 is to be the preferred source. If it is desired to make the source 15 the preferred source, the master selector switch may be operated so that the contact segments move to the right. The change-over switch 70 will thereupon be energized through contact members 98b and 72d to connect the control conductors to the source 15.

In order to initiate operation of the system the manual control switch 36 must be operated to the "close" position. With the transfer relays 80 and 82 in the operated positions, an energizing circuit will be provided for the closing relay 30, extending from the conductor 32a through conductor 110, resistor 111, conductor 112, contact member 104b, conductor 113, contact member 103b, conductors 114 and 115, contact members 36b, conductor 116, contact members 33b, operating winding 31, conductor 118, contact members 20c, conductor 119, contact members 80a, contact member 98e, and conductor 109, back to the control conductor 32c.

The closing relay 30 operates, and provides an obvious energizing circuit for the operating winding 24 of the main circuit breaker 18. The circuit breaker 18 closes and connects the bus conductor 10 to the source 15. The cut-off relay 33 is shunted down through contact members 18a of the circuit breaker, thereby interrupting the energizing circuit for the operating winding 31 of the closing relay 30 at contact members 33b, which open.

Should the voltage of the power source 15 fail, for reasons not resulting from a fault condition on the bus conductors, the master voltage relay 94 operates to the under voltage position with the moving contacts engaging stationary contact members 94b. Accordingly, the operating winding 85 of the transfer relay 80 is deenergized and the reset winding 90 is energized. The latch member 88 is thereupon retracted, releasing the armature 83 to the deenergized position. An energizing circuit is thereupon provided for the trip winding 29 of the circuit breaker 18 through contact members 88a of the latch member, conductor 132, conductor 127, contact member 18a of the circuit breaker 18 and conductor 125.

If the voltage of the other power source 16 is of a suitable value, the transfer relay 82 will be in its operated or closed position. Accordingly, an energizing circuit will be provided for the operating winding 50 of the closing relay 49 extending from the control conductor 32a through conductor 110, resistor 111, conductor 112, contact member 104b, conductor 113, contact member 103b, conductor 114, conductor 115, contact member 36b, conductors 116 and 117, contact members 52b, operating winding 50, conductor 133, contact members 18c, conductor 134, contact members 82c, conductor 136, contact members 88b, contact member 98e, and conductor 109, back to control conductor 32c.

The closing relay 49 operates, and provides an obvious energizing circuit for the operating winding 44, causing the main circuit breaker 20 to close. The feeder bus 10 is thereupon connected to the power source 16, and the cut-off relay 52 is shunted down through contact member 20a, so as to interrupt the energizing circuit for the operating winding 50.

With the control conductors 32a, 32b, and 32c originally energized from the source 15, the control voltage relay 76 will have been deenergized immediately upon failure of voltage of the source 15, and the change-over switch 70 will have returned to the deenergized position. Operation of the change-over switch 72 is affected automatically, independently of operation of the transfer of the connections of the bus 10, since an energizing circuit is provided for the operating winding 74 upon the return of the control voltage relay 76 and the change-over switch 70 to their deenergized positions. This circuit may be traced from the center tap conductor 69b through the operating winding 74, conductor 142, contact member 70d, contact member 76b, conductor 143 and contact member 77b, back to the control conductor 69c. Accordingly, a dependable source of control voltage is assured immediately upon failure of the power source 15, for operation of the circuit breaker control relays.

Should the voltage of the power source 15 be restored, the control voltage relay 76 returns to the energized position, interrupting the energizing circuit for the change-over switch 72. The switch 72 opens completing the energizing circuit for the change-over switch 70 through contact member 72d. The connection of the control conductors is thereby transferred back to the preferred source as soon as voltage is restored thereto.

Upon the restoration of voltage to the source 15, the master voltage relay 94 returns to the operating or normal voltage position, and completes an obvious energizing circuit for the operating winding 85 of the transfer relay 80, and deenergizes the reset winding 90. Accordingly, the transfer relay 80 is actuated to the operated position, and the latch member 88 is actuated to lock the armature 83 in the operative position.

Upon closing of contact members 80c, an energizing circuit is provided for the trip winding 47 of the main circuit breaker 20 extending from negative through the trip winding 47, contact member 20d, conductor 145, contact member 80c, and contact member 93h, to positive. The circuit breaker 20 is thereby tripped, and an energizing circuit is provided for the operating winding 31 of the closing relay 30, through the circuit extending from the control conductor 32a through conductor 110, resistor 111, conductor 112, contact member 104b, conductor 113, contact member 103b, conductor 114, conductor 115, contact member 36b, conductor 116, contact member 33b, operating winding 31, conductor 118, contact member 28c, conductor 119, contact member 80a, contact member 98e, and conductor 109, back to the control conductor 32c. Accordingly, the closing relay 30 operates, and effects closure of the main circuit breaker 18.

Should the voltage of the power source 15 drop below a predetermined value or fail, due to a fault on the bus conductors 10, it is not deemed desirable to effect automatic transfer of the bus conductors to the source 16. Accordingly, when a fault occurs on the bus conductors 10 while they are connected to source 15, the current responsive relay 100 operates and provides an obvious energizing circuit for the auxiliary protective relay 103 which is thereupon locked in the energized position.

Upon operation of the protective relay 103, the trip winding 57 of the feeder circuit breaker 13 is energized through an obvious circuit completed at contact member 103a. At the same time, the trip winding 29 of the main circuit breaker 18 is energized through an energizing circuit extending from negative through the operating winding 29, conductor 125, contact member 18d, conductor 127, conductor 128, conductor 149, and contact member 103c to positive. In addition, the operating circuit for the closing relay 49 of the circuit breaker 20 is interrupted at contact member 103b, thus effectively preventing closure of the circuit breaker 20. After the fault has been removed, the auxiliary protective relay 103 may be reset by the operator, whereupon automatic control will be resumed and the feeder bus will be reconnected to either the source 15 or 16 in the usual manner.

From the above description and the accompanying drawings, it will be apparent that I have provided a voltage chaser or transfer system, wherein a single master selector switch is utilized to both determine whether control of the system is to be automatic or manual, and whether one power source or the other is to be the preferred source. Automatic transfer of the power conductors is obtained by using quick response transfer switches of the mechanically latched type. This eliminates the usual holding circuits and insures positive transfer operation as indicated by the master voltage relays, with no time delay after the master relay initiates a transfer. Loss of control voltage does not affect the circuit set up, since the transfer switch is mechanically latched and remains in the position to which it was last operated. By utilizing voltage relays of the quick-responsive type for controlling transfer of the source of control voltage, a reliable source of control voltage is insured. The use of relatively slow-responsive master voltage relays for effecting transfer of the power circuits prevents hunting of the system due to transfers in response to transient conditions. Complete and adequate protection is provided by locking out the automatic transfer feature when a loss of voltage results from a fault condition on the feeder bus, thereby preventing transfer of a faulty bus to the alternate source.

Since certain changes may be made in the above-described construction and different embodiments of the invention may be made without departing from the spirit and scope thereof, it is intended that all the matter contained in the above description and shown in the accompanying drawings shall be considered as illustrative and not in a limiting sense.

I claim as my invention:

1. In a control system, a pair of switch means disposed to connect a circuit to one or the other of two sources, transfer means operable to provide operating circuits for the switch means, control means responsive to voltage conditions of the sources above and below predetermined values connected to effect operation of the transfer means, manual control means associated with each of the switch means, and circuit means including a manual control switch operable to connect the transfer means for operating the switch means to effect automatic transfer of the circuit to one or the other of the sources with preferential selection of either source or connect the switch means for operation through their manual control means.

2. In a transfer system for connecting a feeder bus to one of two power sources, switch means disposed to connect the bus to one or the other of the sources, transfer means controlling operation of the switch means, voltage responsive means associated with each of the sources connected to effect operation of the transfer means in accordance with voltage conditions of the sources above and below predetermined values, control means controlled by the transfer means effective to operate the switch means, additional switch means operable to energize the control means, and circuit means including additional voltage responsive means connected to control the additional switch means independently of the first-mentioned voltage responsive means to effect connection of the control means to whichever source has greater than a predetermined voltage.

3. A transfer system disposed to connect a feeder bus to either one of two power sources comprising, switch means operable to connect the bus to one source or the other, voltage means associated with each of the sources operable in response to predetermined voltage conditions of the sources, and circuit means including a transfer relay operable to different positions in response to operation of the voltage means connected to provide an operating circuit for one or the other of the switch means, said transfer means being mechanically latched in one operating position and releasable to the other operating position.

4. A transfer system for controlling the operation of a pair of switch devices disposed to connect a feeder bus to different power sources comprising, a transfer relay connected to operate each switch device, each of said transfer relays having an operating winding and latch means for retaining the relay in the operated position together with a reset winding for actuating the latch means to release the relay from the operated position, and voltage means responsive to voltage conditions of each source above and below predetermined values connected to selectively energize the operating and reset windings of their respective transfer relays depending upon whether the voltages of the sources are above or below the predetermined values.

5. A transfer system for a feeder bus and two power sources, switch means operable to connect the bus to each of the sources, a transfer relay controlling the operation of each of the switch means, said transfer relay having operating and reset windings disposed to actuate the relay to operating and reset positions, said transfer relay having mechanical latch means operable to retain the relay in the operating position and actuable upon energization of the reset winding to release the relay to the reset position, and a voltage relay energized from each power source connected to effect energization of the operating or reset windings, depending upon whether the voltages of the sources are above or below predetermined operating values.

6. A transfer system for controlling the connection of a feeder bus to different power sources comprising, circuit breaker means disposed to connect the bus to the different sources, transfer means disposed to provide operating circuits for the circuit breaker means, relay means selectively responsive to the voltages of the sources above and below predetermined values connected to control operation of the transfer means, manual control means disposed to effect operation of the circuit breaker means, and a single manual control switch selectively operable to connect the circuit breaker means for operation in response to operation of the transfer means or the manual control means.

7. A transfer system for selectively controlling the connection of a feeder bus to a pair of power sources comprising, a circuit breaker disposed to connect the bus to each source, manual control means actuable to effect operation of each of the circuit breakers, transfer means disposed to operate each of the circuit breakers, relay means responsive to voltage conditions at the sources connected to effect predetermined operation of the transfer means in accordance with the voltages of the sources, and a manual control switch operable to different positions to connect the circuit breakers for effecting preferential connection of the bus to one power source or the other under control of the transfer means, or to connect them for operation under control of the manual control means.

8. In a transfer system for a pair of circuit breakers disposed to connect a feeder bus to one or the other of two power sources, transfer means connected to effect operation of the circuit breakers to connect the bus to one of the sources including a voltage relay operable in response to the voltage of the source being above a predetermined value, manual control means disposed to effect operation of the circuit breakers, control means operable to connect the circuit breakers for operation in response to operation of the transfer means or the manual control means, and protective means responsive to a fault on the bus operable to render the transfer means ineffective to operate either of the circuit breakers.

9. In a control system for a pair of circuit breakers disposed to connect a polyphase feeder bus to one or the other of two polyphase power sources, a circuit breaker disposed to connect the bus to each source, transfer means disposed to provide an operating circuit for each circuit breaker, polyphase voltage means controlling the transfer means, circuit means including a single phase transformer having a center tap connected to each of the sources for supplying electrical energy to operating circuits for the breakers, a single phase potential transformer connected in open delta with each of the aforesaid single phase transformers to supply electrical energy to the polyphase voltage means, switch means connected in circuit relation with the aforesaid single phase transformers and the breaker operating circuits, and single phase voltage means responsive to the voltage of said single phase transformers for operating the switch means to transfer connection breaker operating circuit from one single phase transformer to the other should the voltage on said one fail.

GLEN L. CLAYBOURN.

REFERENCES CITED

The following references are of record in the file of this patent:

UNITED STATES PATENTS

| Number | Name | Date |
|---|---|---|
| 1,208,775 | Hamilton | Dec. 19, 1916 |
| 1,528,045 | Butcher | Mar. 3, 1925 |
| 1,615,669 | Bany | Jan. 25, 1927 |
| 1,681,158 | Anderson | Aug. 21, 1928 |
| 1,869,330 | Anderson | July 26, 1932 |
| 2,025,653 | Dyer | Dec. 24, 1935 |